No. 711,478. Patented Oct. 21, 1902.
A. J. CUNNINGHAM.
METALLIC PISTON AND VALVE ROD PACKING.
(Application filed Sept. 30, 1901.)
(No Model.)
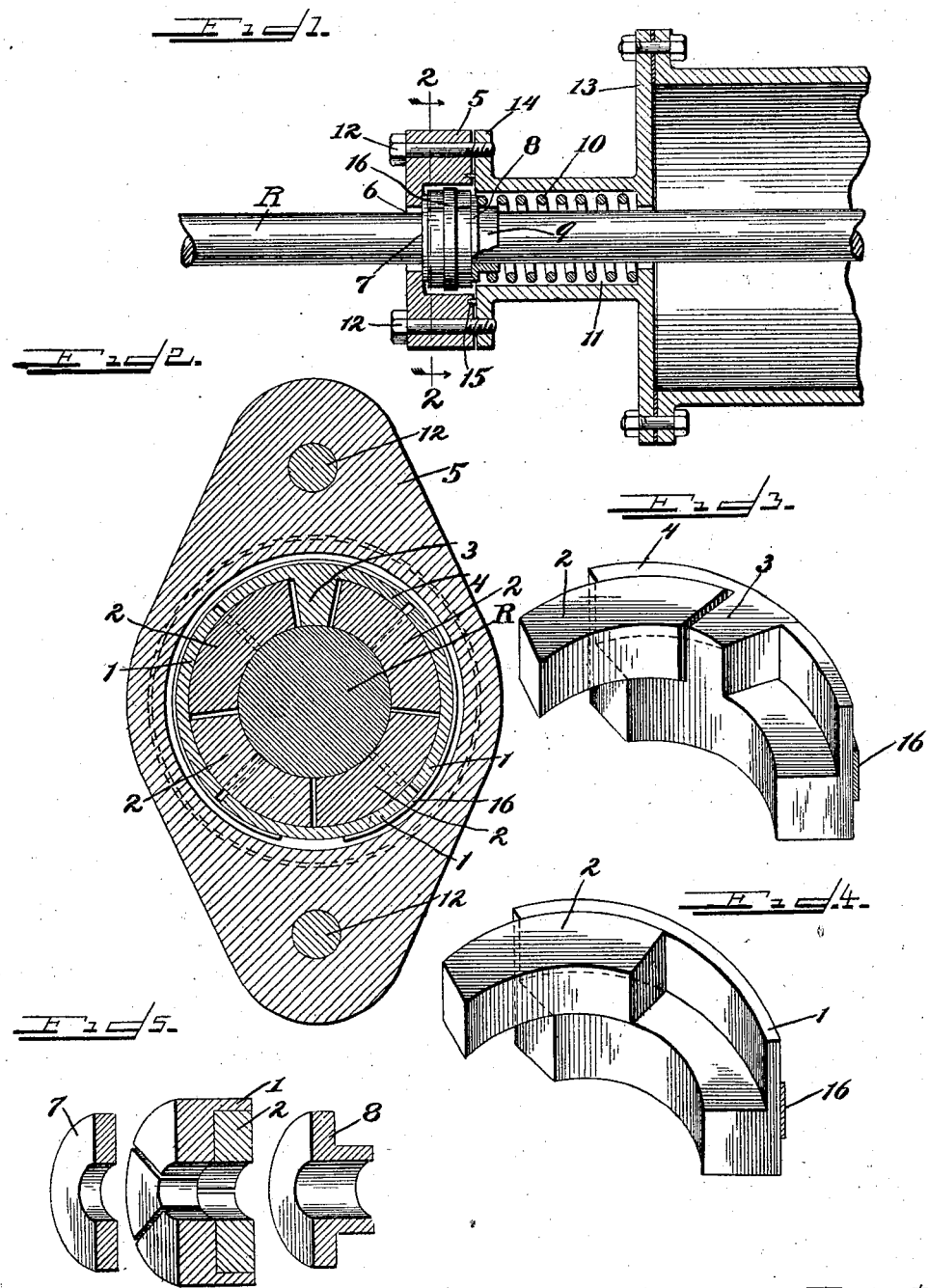

UNITED STATES PATENT OFFICE.

ARCHIE J. CUNNINGHAM, OF CHICAGO, ILLINOIS.

METALLIC PISTON AND VALVE ROD PACKING.

SPECIFICATION forming part of Letters Patent No. 711,478, dated October 21, 1902.

Application filed September 30, 1901. Serial No. 77,029. (No model.)

*To all whom it may concern:*

Be it known that I, ARCHIE J. CUNNINGHAM, a citizen of the United States, residing at Chicago, in the county of Cook and State of Illinois, have invented certain new and useful Improvements in Metallic Piston and Valve Rod Packings, of which the following is a specification.

This invention relates to improvements in piston and valve rod packings of sectional metallic construction in which the pressure of the steam or other fluid to be restrained is depended upon to close the sections in upon the rod and hold them together, so as to form a tight joint about the rod at their point of application.

The object of the invention is to provide a greatly-simplified and exceedingly-efficient construction in packings of this character which will be of low initial cost and little likely to require attention or repairs and in which the occasional adjustments rendered necessary by inevitable wear may be readily accomplished without special adjusting devices and by the simplest kind of manipulation.

The invention consists in the matters hereinafter set forth, and particularly pointed out in the appended claims, and will be fully understood from the following description of the accompanying drawings, in which—

Figure 1 is a longitudinal sectional elevation of a piston or valve rod stuffing-box provided with a packing embodying my invention in one form. Fig. 2 is an enlarged sectional detail taken on line 2 2 of Fig. 1. Figs. 3 and 4 are perspective details showing the forms of the packing-ring sections. Fig. 5 is a sectional detail in perspective of the several parts of the packing.

The improved packing thus illustrated comprises an outer ring 1, made up of a plurality of segments of L-shaped cross-section. Said segments are herein shown as four in number; but it will be understood that the exact number of segments into which the ring is divided is not material. Fitting within the angle of this L-shaped outer ring is a plain inner ring of rectangular cross-section, which is also made up of segments that are arranged to break joints with the segments of the outer ring. This relation of the two rings is insured by an integral lug 3, formed within the recess of one of the sections 4 of the outer ring. This lug engages the ends of two of the inner-ring sections 2 and prevents any rotation of the rings with respect to each other, thus permanently maintaining the staggered relation of their joints. The packing-ring thus formed is inclosed within a gland 5, that is bored out to a diameter somewhat larger than that of the outer ring, so that the steam entering the gland can circulate freely about the ring. The front of the gland is provided with an aperture 6 large enough to loosely admit the valve-rod, and between the inner front face of the gland and the face of the packing is located a plain cylindric bearing-ring 7, which will ordinarily be of brass, the other parts being conveniently, although not necessarily, made of cast-iron. A somewhat-similar bearing-ring 8 is located at the inner end of the packing and is provided with an inwardly-projecting flange 9, that serves to support and center a spring 10, which holds the packing constantly up against the front of the gland. This latter is secured by bolts 12 to the cylinder or the valve-chest head 13 or to the flange 14 of a stuffing-box formed upon said head in the usual manner, a suitable gasket 15 being placed between the gland and head to insure a steam-tight joint between them. As herein shown, the gasket consists of a ring of some comparatively soft metal, such as copper, recessed into the gland and forming a permanent part of the latter.

The packing thus described may be applied with great facility to cylinder and valve chests having stuffing-boxes of the ordinary construction, it being only necessary in such cases to remove the old gland and bolt the new gland 5 in place thereof with the new packing within it, the spring 10 occupying the cavity in the stuffing-box originally designed for the ordinary fibrous packing. The steam entering the stuffing-box from the cylinder or valve-chest will envelop the packing-rings and force them in against the rod with an intensity proportionate to the pressure of steam exerted. A spring 16 is placed about the packing-rings to hold them together in contact with the rod when no pressure is on; but this spring has no other work to perform and will desirably be made as light as possible.

Such improved packing is not only obviously simple in its construction, exceedingly cheap to manufacture, and easy to apply, but it may readily be adjusted to compensate for wear by simply filing off one or more of the segments of each ring to allow them to close together upon a smaller circle, and this operation may be performed by the most unskilled operator and without the use of any other tools or appliances. The packing will, furthermore, maintain a tight joint even though the piston or valve rod is so sprung or connected as to have a considerable lateral play in the stuffing-box, since such play will simply result in a sliding movement of the bearing-plate 7 on the front of the gland, the latter being bored out sufficiently larger than the packing-rings and valve-rod to permit such lateral movement.

I claim as my invention—

1. In combination, a steam-chamber, a valve-rod entering said chamber and a metallic packing for said rod comprised of an outer ring formed of a plurality of segments, of L-shaped cross-section one of which segments has a lug projecting into its recess, a sectional inner ring fitting closely within the recess of the outer ring and held by the lug to break joints therewith, said rings bearing on the valve-rod, a spring-band partially encircling the outer ring and holding the packing-rings in position about the valve-rod, a gland inclosing the packing-rings and formed with a chamber larger in diameter than the packing-rings, a bearing-ring on the valve-rod between the front wall of the gland and the packing-rings and covering the radial joints in the packing-ring, a flanged ring on the valve-rod and bearing against the rear faces of the packing-rings and covering the radial joints therein, and a spring surrounding the valve-rod and bearing at its forward end against the flanged ring and holding the packing-rings within the gland and forcing the bearing-rings against the wall of the gland whereby the packing and bearing rings may move laterally within the gland to follow any lateral movement of the valve-rod without breaking the steam-tight joint.

2. In combination, a steam-chamber, a valve-rod entering said chamber and a metallic packing for said rod comprised of an outer ring formed of a plurality of segments of L-shaped cross-section one of which segments has a lug projecting into its recess, the front and rear faces of said ring being perpendicular to the valve-rod, a sectional inner ring fitting closely within the recess of the outer ring and held by the lug to break joints therewith, the rear face of said ring being perpendicular to the valve-rod, said rings bearing on the valve-rod, a spring-band partially encircling the outer ring and holding the packing-rings in position about the valve-rod, a gland inclosing the packing-rings and formed with a chamber larger in diameter than the packing-rings, a bearing-ring on the valve-rod between the front wall of the gland and the packing-rings and covering the radial joints in the packing-ring, a flanged ring on the valve-rod and bearing against the rear faces of the packing-rings and covering the radial joints therein, and a spring surrounding the valve-rod and bearing at its forward end against the flanged ring and holding the packing-rings within the gland and forcing the bearing-ring against the wall of the gland whereby the packing and bearing rings may move laterally within the gland independently of each other to follow any lateral movement of the valve-rod without breaking the steam-tight joint.

3. A metallic packing for piston and valve rods comprising an outer ring formed of a plurality of segments of L-shaped cross-section one of which segments has a lug projecting into its recess the front and rear faces of said ring being perpendicular to the valve-rod, a sectional inner ring fitting closely within the outer ring and held by the lug to break joints therewith, the rear face of said ring being perpendicular to the valve-rod and flush with the rear face of the reduced portion of the outer ring, a gland inclosing said packing-rings said gland being formed with a chamber larger in diameter than the packing-rings, a spring-band embracing and normally clasping said rings around the valve-rod but permitting the segments of said rings to move radially independent of each other to accommodate themselves to irregularities in the surface of the valve-rod, and a spring applied to hold the packing-rings within the chamber in the gland whereby the entire packing may move laterally to follow the lateral vibrations of the valve-rod.

In testimony that I claim the foregoing as my invention I affix my signature, in presence of two subscribing witnesses, this 27th day of September, A. D. 1901.

A. J. CUNNINGHAM.

Witnesses:
HENRY M. CARTER,
K. A. COSTELLO.